US012791766B2

(12) United States Patent
Lee et al.

(10) Patent No.: US 12,791,766 B2
(45) Date of Patent: Nov. 10, 2026

(54) METHOD OF MANUFACTURING WINDOW FOR A DISPLAY DEVICE

(71) Applicant: Samsung Display Co., Ltd., Yongin-Si (KR)

(72) Inventors: Dong-Sung Lee, Hwaseong-si (KR); Hyunseung Seo, Gwacheon-si (KR); Hui yeon Shon, Seongnam-si (KR); Hyunkyung Yun, Namyangju-si (KR); Changmoo Lee, Suwon-si (KR); Jonghwan Cho, Ansan-si (KR); Yongkyu Kang, Hwaseong-si (KR); Jihyun Ko, Suwon-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 372 days.

(21) Appl. No.: 18/511,146

(22) Filed: Nov. 16, 2023

(65) Prior Publication Data

US 2024/0083806 A1 Mar. 14, 2024

Related U.S. Application Data

(62) Division of application No. 17/077,468, filed on Oct. 22, 2020, now Pat. No. 11,873,245.

(30) Foreign Application Priority Data

Oct. 23, 2019 (KR) ........................ 10-2019-0131826

(51) Int. Cl.
*G02B 1/14* (2015.01)
*C08J 7/046* (2020.01)
(Continued)

(52) U.S. Cl.
CPC ................ *G02B 1/14* (2015.01); *C08J 7/046* (2020.01); *C09D 133/04* (2013.01); *G02B 1/18* (2015.01)

(58) Field of Classification Search
CPC ... C08J 7/046; G02B 1/14; G02B 1/18; C09D 133/04-16; C09D 183/04-12;
(Continued)

(56) References Cited

U.S. PATENT DOCUMENTS 3,790,801 A 2/1974 Coleman
4,576,999 A 3/1986 Eckberg
(Continued)

FOREIGN PATENT DOCUMENTS

CN 107526121 A 12/2017
CN 108102540 A 6/2018
(Continued)

OTHER PUBLICATIONS

Machine translation of JPWO2020/021931 A1, obtained from J-PlatPat service of JPO.*
(Continued)

*Primary Examiner* — Z. Jim Yang
(74) *Attorney, Agent, or Firm* — F. CHAU & ASSOCIATES, LLC

(57) ABSTRACT

A method of manufacturing a window includes preparing a base material layer, forming a first hard coating layer on the base material layer, and forming a second hard coating layer on the first hard coating layer. The forming of the second hard coating layer is performed in an environment having an oxygen concentration of about 0.01% to about 0.1%.

12 Claims, 7 Drawing Sheets

(51) Int. Cl.
*C09D 133/04* (2006.01)
*G02B 1/18* (2015.01)

(58) Field of Classification Search
CPC ................ C09D 175/14; C09D 175/16; G02F 1/133302; G02F 1/133305; G02F 1/133308; G02F 1/133311; G02F 1/133331
See application file for complete search history.

(56) References Cited

U.S. PATENT DOCUMENTS

| | | | |
|---|---|---|---|
| 10,793,747 B2 | 10/2020 | Park et al. | |
| 11,003,138 B2 | 5/2021 | Cho et al. | |
| 2007/0231566 A1* | 10/2007 | Yoneyama | G02B 1/14 427/407.1 |
| 2018/0142127 A1 | 5/2018 | Park et al. | |
| 2018/0149785 A1* | 5/2018 | Lee | G02F 1/133528 |
| 2018/0313978 A1* | 11/2018 | Chang | G02B 1/14 |
| 2019/0002617 A1 | 1/2019 | Kotani | |
| 2019/0031890 A1* | 1/2019 | Asahi | C09D 5/006 |
| 2019/0138127 A1 | 5/2019 | Seo et al. | |
| 2019/0310396 A1* | 10/2019 | Matsumoto | C09D 135/02 |
| 2020/0386917 A1* | 12/2020 | Hashimoto | B32B 27/08 |
| 2021/0023827 A1* | 1/2021 | Fukushima | B32B 27/38 |
| 2021/0043859 A1* | 2/2021 | Yamashita | B32B 7/12 |
| 2021/0095085 A1* | 4/2021 | Ahn | C09D 5/1693 |
| 2021/0122669 A1 | 4/2021 | Lee et al. | |
| 2021/0284866 A1* | 9/2021 | Fukushima | C09D 183/06 |

FOREIGN PATENT DOCUMENTS

| | | | |
|---|---|---|---|
| KR | 10-1058395 | 8/2011 | |
| KR | 10-2015-0080748 | 7/2015 | |
| KR | 10-2017-0141851 | 12/2017 | |
| KR | 10-2018-0058912 | 6/2018 | |
| KR | 10-2019-0052730 | 5/2019 | |
| WO | 2017154660 | 9/2017 | |
| WO | WO-2020021931 A1 * | 1/2020 | B32B 27/00 |
| WO | WO-2020175337 A1 * | 9/2020 | C08G 77/20 |

OTHER PUBLICATIONS

Studer et al., "Overcoming oxygen inhibition in UV-curing of acrylate coatings by carbon dioxide inerting, Part I", Progress in Organic Coatings, 48, 2003, pp. 92-100.
Studer et al., "Overcoming oxygen inhibition in UV-curing of acrylate coatings by carbon dioxide inerting: Part II", 48, 2003, pp. 101-111.

* cited by examiner

METHOD OF MANUFACTURING WINDOW FOR A DISPLAY DEVICE

CROSS-REFERENCE TO RELATED APPLICATIONS

This application is a divisional of U.S. patent application Ser. No. 17/077,468 filed on Oct. 22, 2020, which claims priority under 35 U.S.C. § 119 to Korean Patent Application No. 10-2019-0131826, filed on Oct. 23, 2019 in the Korean Intellectual Property Office, the disclosures of which are incorporated by reference in their entireties herein.

The present inventive concepts herein relate to a window with improved reliability, a method of manufacturing the window, and a display device including the window.

Various display devices used in multimedia devices such as a television, a portable phone, a navigation system, a computer monitor, and a portable game console have been developed. A display device may include a display panel for providing an image having predetermined information to a user, and a window for protecting the display panel.

The window may include a plastic window. The plastic window may be lightweight and may be durable and impact resistant. A window formed of plastic may provide a relatively thin display device and may improve surface hardness, impact resistance and workability of the display device.

SUMMARY

The present inventive concepts may provide a window with improved reliability, a method of manufacturing the window, and a display device including the window.

In an embodiment of the present inventive concepts, a method of manufacturing a window may include preparing a base material layer, forming a first hard coating layer on the base material layer, and forming a second hard coating layer on the first hard coating layer. The forming of the second hard coating layer may be performed in an environment having an oxygen concentration of about 0.01% to about 0.1%.

In an embodiment, the forming of the first hard coating layer may include coating a first solution including acrylic and epoxy on the base material layer, drying the first solution, and hardening the first solution.

In an embodiment, the forming of the second hard coating layer may include coating a second solution including fluorine on the first hard coating layer, drying the second solution, and hardening the second solution.

In an embodiment, the hardening of the second solution may include disposing a preliminary window in a first chamber, the preliminary window comprising the base material layer, the first hard coating layer formed on the base material layer, and the second solution coated on the first hard coating layer, adjusting an oxygen ratio in the first chamber, disposing the first chamber in a second chamber for providing ultraviolet light, and hardening the preliminary window by the ultraviolet light.

In an embodiment, the adjusting of the oxygen ratio may allow an oxygen concentration in the first chamber to range from about 0.01% to about 0.1%.

In an embodiment, the adjusting of the oxygen ratio in the first chamber may include injecting a nitrogen gas into the first chamber.

In an embodiment, the ultraviolet light may have an energy of 800 mJ to 1000 mJ.

In an embodiment, the second hard coating layer may have a hardening rate of about 75% to about 85%, a hardness of about 450 MPa to about 550 MPa, and a surface contact angle of about 100 degrees to about 120 degrees.

In an embodiment of the present inventive concepts, a window may include a base material layer, a first hard coating layer disposed on the base material layer, and a second hard coating layer disposed on the first hard coating layer. The second hard coating layer may have a hardening rate of about 75% to about 85% and a surface contact angle of about 100 degrees to about 120 degrees.

In an embodiment, the second hard coating layer may have a hardness of about 450 MPa to about 550 MPa.

In an embodiment, the second hard coating layer may have a pencil hardness of about 7 H to about 9 H.

In an embodiment, the first hard coating layer may include epoxy and acrylic.

In an embodiment, the second hard coating layer may include fluorine.

In an embodiment, a thickness of the base material layer may be greater than a thickness of the first hard coating layer, and the thickness of the first hard coating layer may be greater than a thickness of the second hard coating layer.

In an embodiment of the present inventive concepts, a display device may include a display panel, and a window disposed on the display panel. The window may include a base material layer, a first hard coating layer disposed on the base material layer, and a second hard coating layer disposed on the first hard coating layer. The second hard coating layer may have a hardening rate of about 75% to about 85%, a hardness of about 450 MPa to about 550 MPa, and a surface contact angle of about 100 degrees to about 120 degrees.

In an embodiment, at least one end of the window may be bent.

In an embodiment, a thickness of the base material layer may be greater than a thickness of the first hard coating layer, and the thickness of the first hard coating layer may be greater than a thickness of the second hard coating layer.

In an embodiment, the first hard coating layer may include epoxy and acrylic.

In an embodiment, the second hard coating layer may include fluorine.

In an embodiment, the second hard coating layer may have a pencil hardness of about 7 H to about 9 H.

BRIEF DESCRIPTION OF THE DRAWINGS

The accompanying drawings are included to provide a further understanding of the present inventive concepts, and are incorporated in and constitute a part of this specification. The drawings illustrate embodiments of the present inventive concepts and, together with the description, serve to explain principles of the present inventive concepts. In the drawings.

DETAILED DESCRIPTION OF EMBODIMENTS

Figure 1:
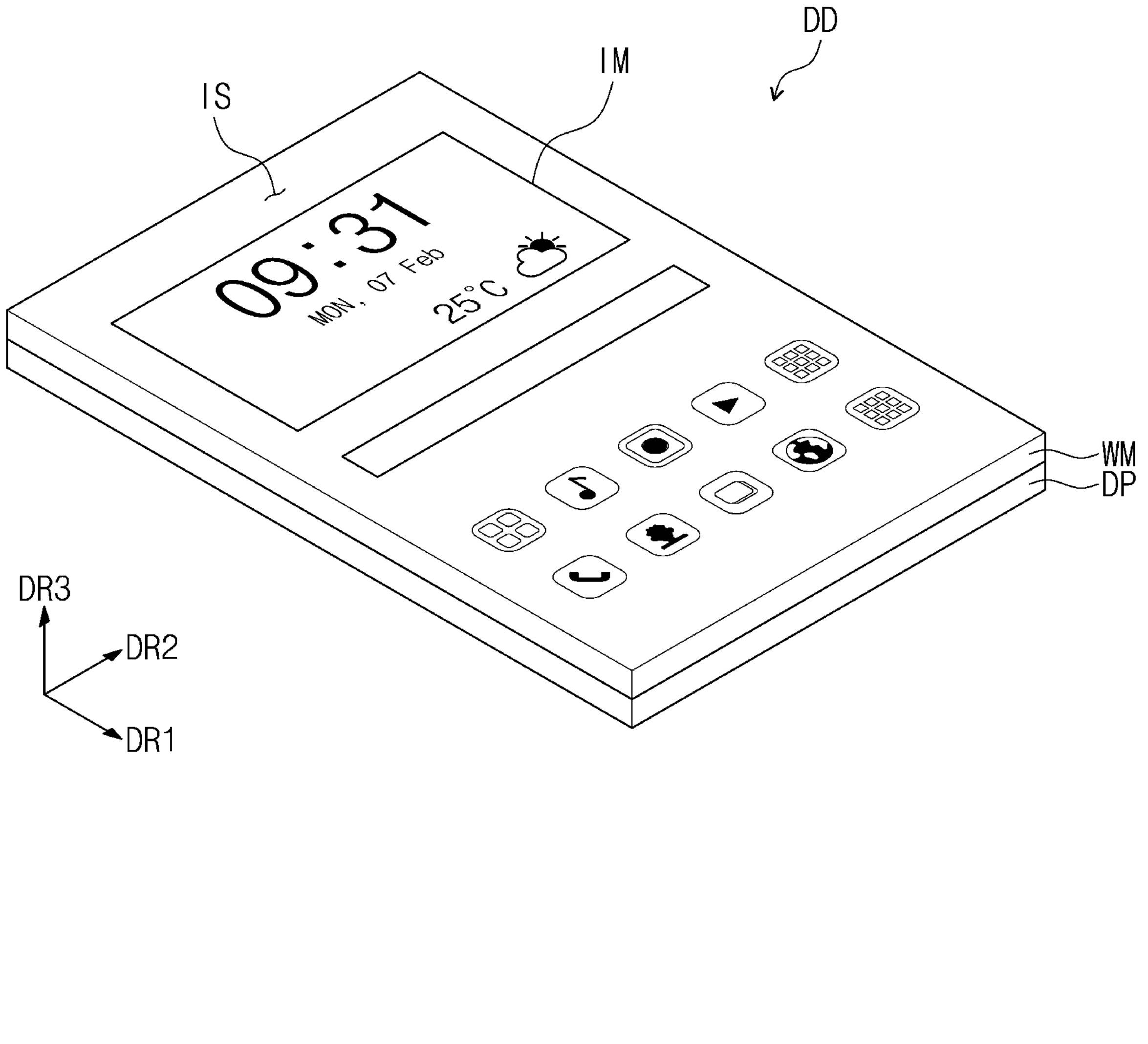
FIG. 1 is a perspective view of a display device according to an embodiment of the present inventive concepts.

The present inventive concepts now will be described more fully hereinafter with reference to the accompanying drawings, in which various embodiments are shown. The present inventive concepts may, however, be embodied in many different forms, and should not be construed as limited to the embodiments set forth herein. Rather, these embodiments are provided to convey the present inventive concepts to those skilled in the art. Like reference numerals refer to like elements throughout.

It will be understood that when a first element such as a layer, region or substrate is referred to as being “on” a second element, it can be directly on the other element or intervening elements may be present. In contrast, the term “directly” means that there are no intervening elements present between the first element and the second element. As used herein, the term “and/or” includes any and all combinations of one or more of the associated listed items.

The terminology used herein is for the purpose of describing particular embodiments only and is not intended to be limiting. As used herein, the singular forms “a,” “an,” and “the” are intended to include the plural forms, including “at least one,” unless the content clearly indicates otherwise. “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as “beneath”, “below”, “lower”, “above”, “upper” and the like, may be used herein for ease of description to describe one element or feature’s relationship to another element(s) or feature(s) as illustrated in the figures. However, it will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the exemplary term “below” can encompass both an orientation of above and below. The device may also be otherwise oriented (e.g., rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

“About” or “approximately” as used herein is inclusive of the stated value and means within an acceptable range of deviation for the particular value as determined by one of ordinary skill in the art, considering the measurement in question and the error associated with measurement of the particular quantity (e.g., the limitations of the measurement system).

Embodiments of the present inventive concepts are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, embodiments should not be construed as limited to the shapes of regions illustrated herein but are to include deviations in shapes that result, for example, from manufacturing. For example, an etching region illustrated as a rectangle will typically have rounded or curved features. Thus, the regions illustrated in the figures are schematic in nature and their shapes are not intended to illustrate the actual shape of a region of a device and are not intended to limit the scope of the embodiments.

Hereinafter, embodiments of the present inventive concepts will be described in detail with reference to the accompanying drawings.

Figure 2:
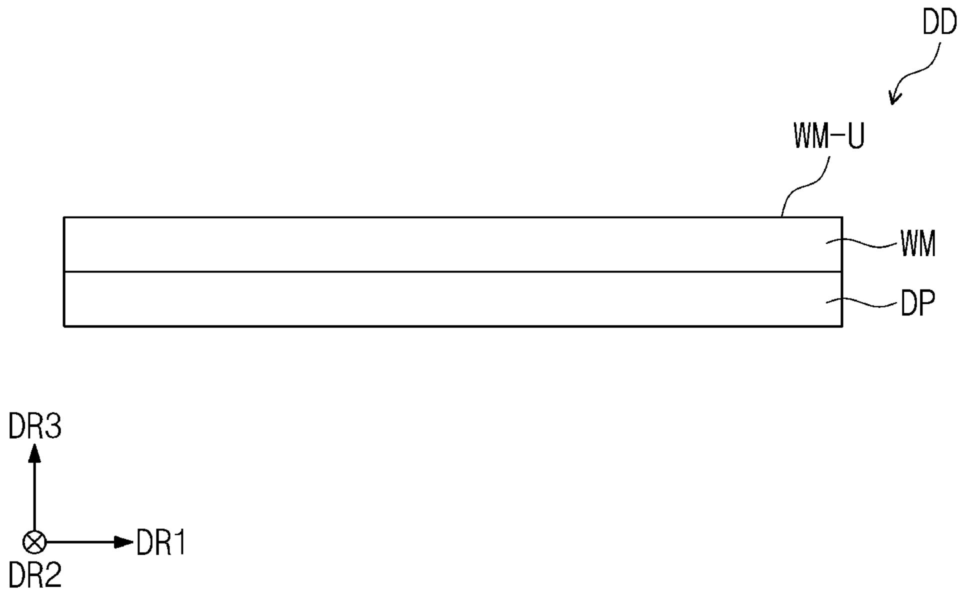
FIG. 2 is a cross-sectional view of a display device according to an embodiment of the present inventive concepts.

FIG. 1 is a perspective view illustrating a display device according to an embodiment of the present inventive concepts. FIG. 2 is a cross-sectional view illustrating a display device according to an embodiment of the present inventive concepts.

Referring to the embodiments of FIGS. 1 and 2, a display device DD may include a display panel DP and a window WM. The display device DD may display an image IM through a display surface IS. As shown in the embodiment of FIG. 1, the display surface IS may be parallel to a plane defined in a first direction DR1 and a second direction DR2 that are perpendicular to each other. A normal direction of the display surface IS (e.g., a thickness direction of the display device DD) may be a third direction DR3 that is perpendicular to the first direction DR1 and the second direction DR2.

However, embodiments of the present inventive concepts are not limited thereto and the directions indicated by the first to third directions DR1, DR2 and DR3 may be relative concepts that are changed into other directions. Furthermore, in other embodiments, the display panel DP and the display surface IS may be three-dimensional. In the present specification, a view (or plane) defined by the first and second directions DR1 and DR2 may correspond to a plan view, and it may be understood that when one or more components are viewed in a plan view, they may be viewed from the third direction DR3.

The display panel DP may display the image IM. In the embodiment of FIG. 1, a time, calendar and weather display box and icons are illustrated as an example of the image IM. However, embodiments of the present inventive concepts are not limited thereto and the image IM may be at least one of various still or moving images. The display panel DP according to an embodiment of the present inventive concepts may include a light receiving type or light emitting type display panel. In an embodiment, the light receiving type display panel may be a liquid crystal display panel. In an embodiment, the light emitting type display panel may be an organic light emitting display panel or a quantum-dot light emitting display panel. However, embodiments of the present inventive concepts are not limited thereto. An emission layer of the organic light emitting display panel may include an organic light emitting material. An emission layer of the quantum-dot light emitting display panel may include quantum dots and/or quantum rods.

The window WM may be disposed on the display panel DP. For example, as shown in the embodiments of FIGS. 1-2, the window WM may be disposed directly on the display panel DP (e.g., in the third direction DR3). An upper surface of the display panel DP may directly contact a lower surface of the window WM. The image IM provided by the display panel DP may be transmitted through the window WM for viewing by the user. In an embodiment, a top surface WM-U of the window WM may be substantially flat (e.g., extending in the first direction DR1 and second direction DR2).

Figure 3:
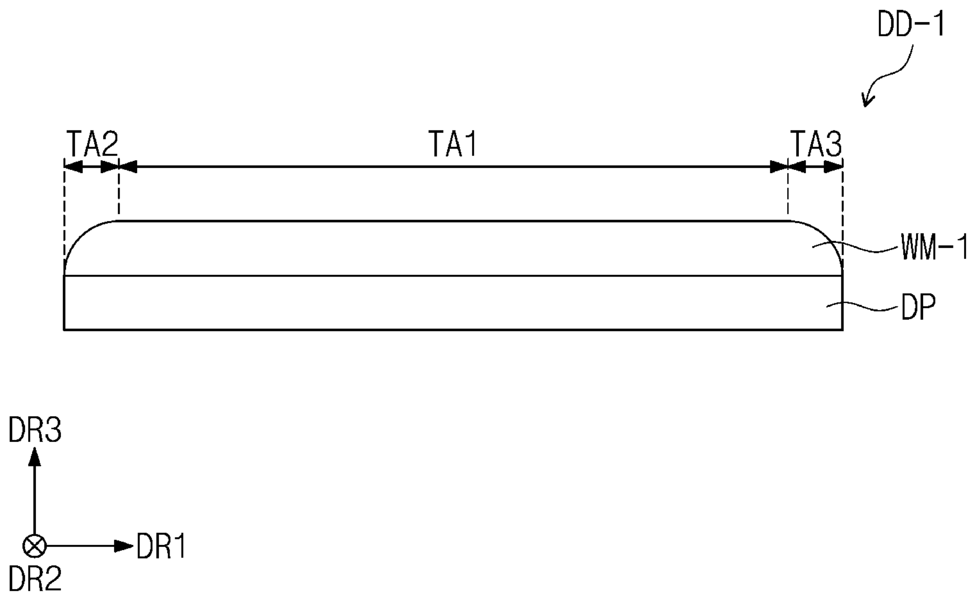
FIG. 3 is a cross-sectional view of a display device according to an embodiment of the present inventive concepts.

FIG. 3 is a cross-sectional view illustrating a display device according to an embodiment of the present inventive concepts.

Referring to the embodiment of FIG. 3, a display device DD-1 may include a window WM-1 and the display panel DP disposed under the window WM-1 (e.g., in the third direction DR3). The window WM-1 may include a first transmission area TA1, a second transmission area TA2 on a first lateral end, and a third transmission area TA3 on a second lateral end that is opposite the first lateral end. A top surface of the first transmission area TA1 may be substantially flat (e.g., extending in the first direction DR1 and second direction DR2).

The second transmission area TA2 may be disposed adjacent to the first transmission area TA1 (e.g., adjacent in the first direction DR1). A top surface of the second transmission area TA2 may include a curved surface. A gradient of the curved top surface of the second transmission area TA2 may decrease as a distance from the first transmission area TA1 in the first direction DR1 decreases.

The third transmission area TA3 may be spaced apart from the second transmission area TA2 (e.g., in the first direction DR1) with the first transmission area TA1 interposed therebetween. A top surface of the third transmission area TA3 may include a curved surface. A gradient of the top surface of the third transmission area TA3 may decrease as a distance from the first transmission area TA1 in the first direction DR1 decreases. In an embodiment, the curvature of the third transmission area TA3 may correspond to the curvature of the second transmission area TA2 but may be extend in an opposite direction in the first direction DR1.

Figure 4:
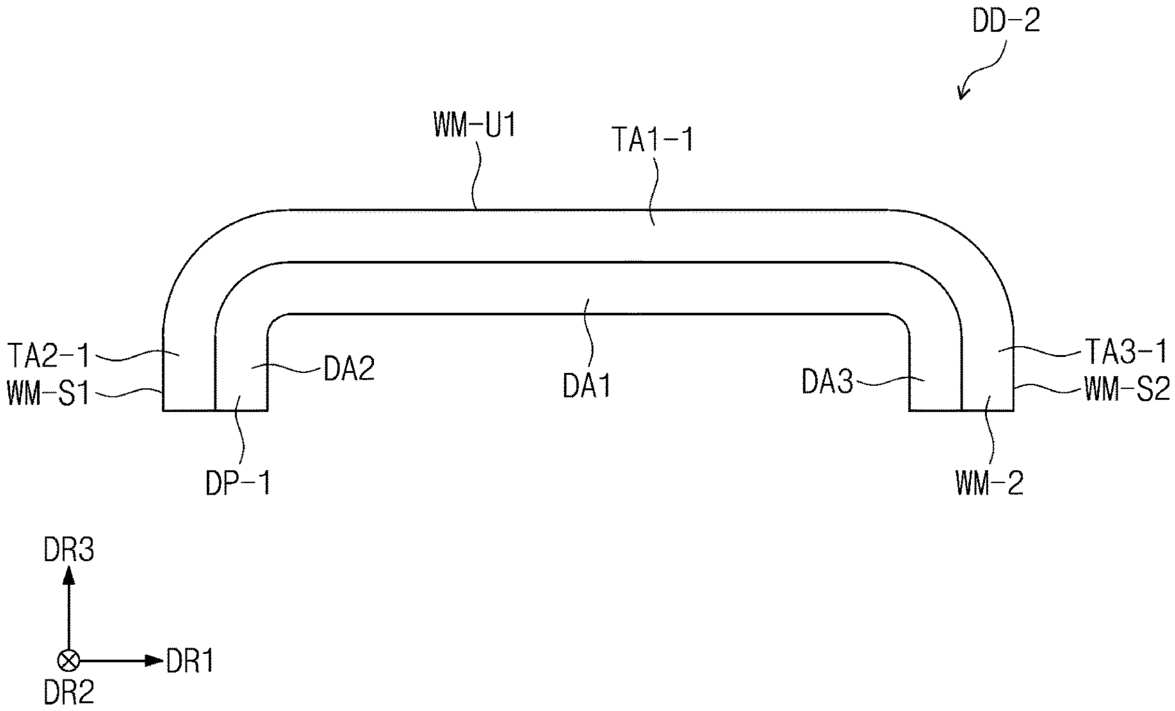
FIG. 4 is a cross-sectional view of a display device according to an embodiment of the present inventive concepts.

FIG. 4 is a cross-sectional view illustrating a display device according to an embodiment of the present inventive concepts.

Referring to the embodiment of FIG. 4, a display device DD-2 may include a window WM-2 and a display panel DP-1 disposed under the window WM-2.

As shown in the embodiment of FIG. 4, the window WM-2 may include a first transmission area TA-1, a second transmission area TA2-1, and a third transmission area TA3-1. The display panel DP-1 may include a first display area DA1, a second display area DA2, and a third display area DA3. The display panel DP-1 and the window WM-2 may be generally C-shaped having a first lateral end including the second display area DA2 and second transmission area TA2-1 and a second lateral end including the third display area DA3 and third transmission area TA3-1 which extend substantially orthogonal from the first display area DA1 and the first transmission area TA1-1 of the display panel DP-1 and window WM-2, respectively. The first transmission area TA1-1 may face the first display area DA1. The first display area DA1 may display the image IM (see FIG. 1) through the first transmission area TA1-1 in the third direction DR3.

The second transmission area TA2-1 may be adjacent to the first transmission area TA1-1. The second transmission area TA2-1 may face the second display area DA2. The second display area DA2 may display the image IM (see FIG. 1) through the second transmission area TA2-1 in a direction intersecting the third direction DR3. For example, as shown in the embodiment of FIG. 4, when an angle between a straight line extending from a top surface WM-U1 of the window WM-2 and a straight line extending from a first side surface WM-S1 of the window WM-2 is about 90 degrees, the intersecting direction may be the first direction DR1.

The third transmission area TA3-1 may be disposed adjacent to the first transmission area TA1-1. The third transmission area TA3-1 may face the third display area DA3. The third display area DA3 may display the image IM (see FIG. 1) through the third transmission area TA3-1 in a direction intersecting the third direction DR3. For example, as shown in the embodiment of FIG. 4, when an angle between a straight line extending from the top surface WM-U1 of the window WM-2 and a straight line extending from a second side surface WM-S2 of the window WM-2 is about 90 degrees, the intersecting direction may be the first direction DR1. However, the configuration of the display panel DP-1 and the window WM-2 is not limited to the shapes shown in the embodiment of FIG. 4, and the display panel DP-1 and the window WM-2 may have various different shapes.

Figure 5:
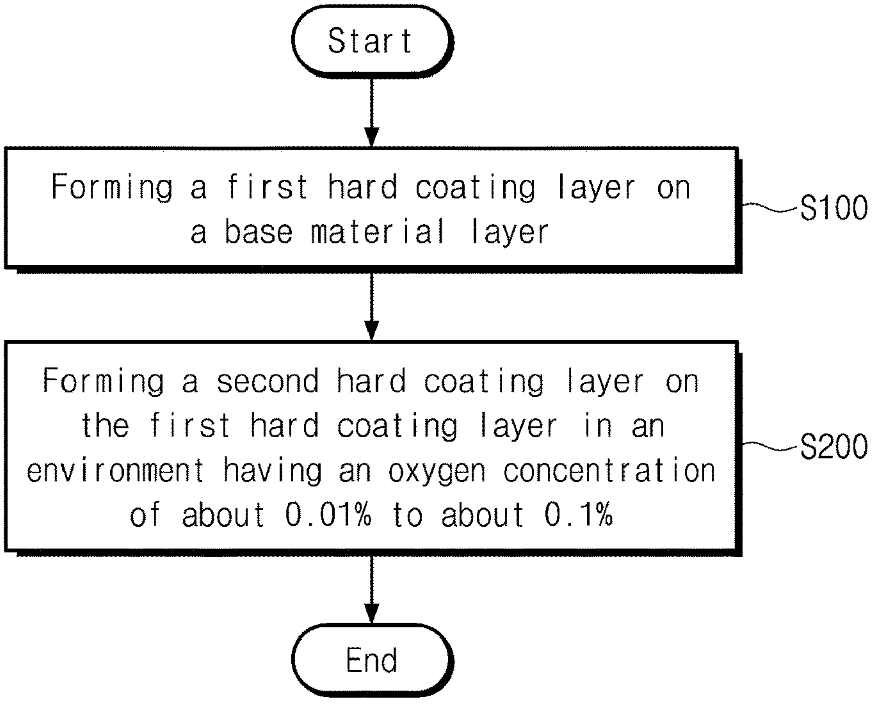
FIG. 5 is a flowchart of a method of manufacturing a window, according to an embodiment of the present inventive concepts.
Figure 6:
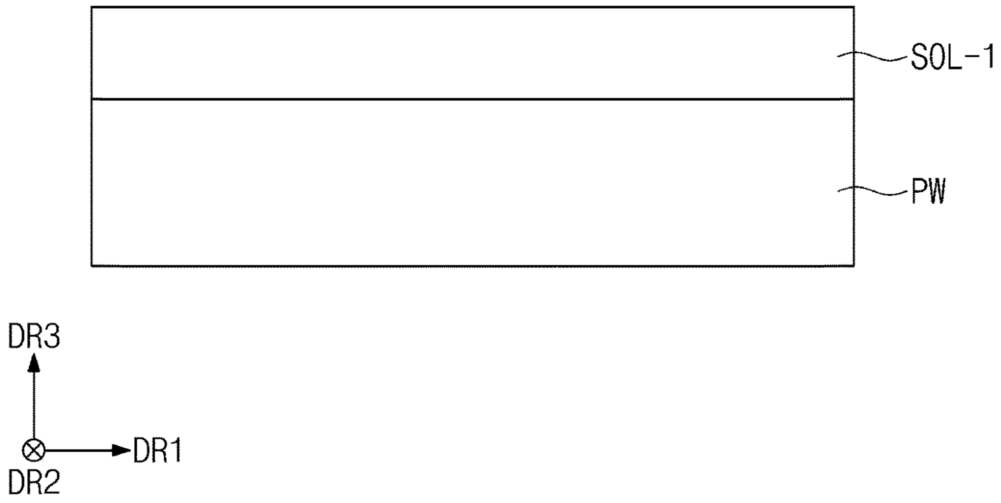
FIG. 6 is a cross-sectional view of a process of forming a first hard coating layer according to an embodiment of the present inventive concepts.
Figure 7:
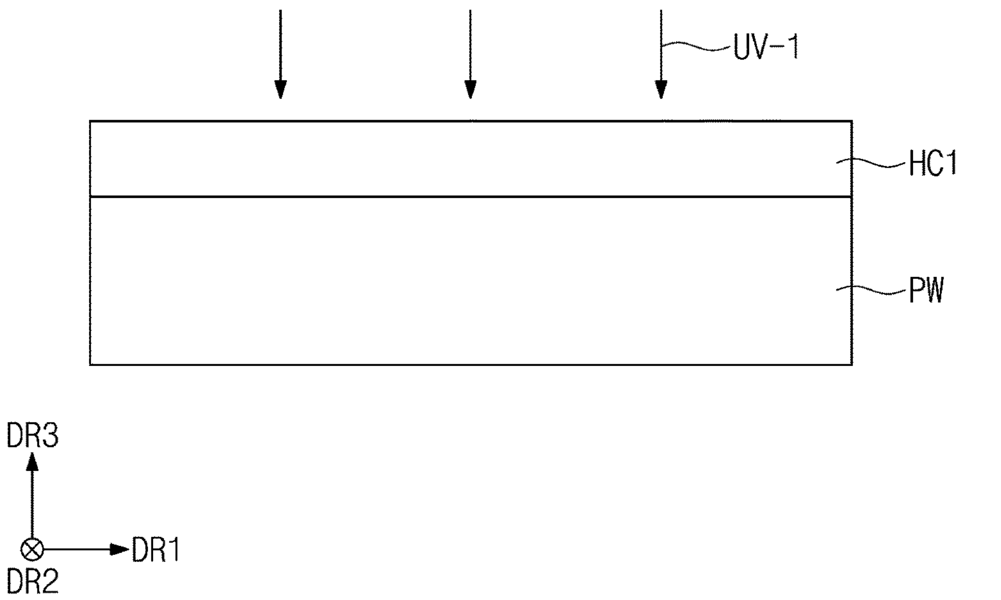
FIG. 7 is a cross-sectional view of the process of forming the first hard coating layer according to an embodiment of the present inventive concepts.

FIG. 5 is a flowchart illustrating a method of manufacturing a window, according to an embodiment of the present inventive concepts. FIG. 6 is a cross-sectional view illustrating a process of forming a first hard coating layer, according to an embodiment of the present inventive concepts. FIG. 7 is a cross-sectional view illustrating the process of forming the first hard coating layer, according to an embodiment of the present inventive concepts.

Referring to the embodiment of FIGS. 5 to 7, in block S100, a first hard coating layer HC1 may be formed on a base material layer PW (e.g., in the third direction DR3). The base material layer PW may include a light transmitting plastic. In an embodiment, the base material layer PW may include at least one compound selected from polyethylene (PET), polypropylene (PP), polyamide (PA), polyacetal (POM), polycarbonate (PC), poly(methyl methacrylate) (PMMA), polybutylene terephthalate (PBT), polycarbonate blend-based resin, cellulose, dampproof cellophane, and a low-refractive index resin. However, embodiments of the present inventive concepts are not limited thereto and the material of the base material layer PW may be various different materials.

A first solution SOL-1 may be coated on the base material layer PW. For example, the first solution SOL-1 may be coated directly on an upper surface of the base material layer PW (e.g., in the third direction DR3). In an embodiment, the first solution SOL-1 may include an organic material. For example, the organic material may include acrylic and epoxy. However, embodiments of the present inventive concepts are not limited thereto.

The first solution SOL-1 may be hardened (e.g., cured, dried) after being coated on the base material layer PW. For example, as shown in the embodiment of FIG. 7, the first solution SOL-1 coated on the base material layer PW may be hardened by a first ultraviolet light UV-1. The first solution SOL-1 hardened by the first ultraviolet light UV-1 may form the first hard coating layer HC1.

In an embodiment, the first hard coating layer HC1 may include an organic material and an inorganic material. The first hard coating layer HC1 may have a strong hardness. The organic material may include acrylic and epoxy. For example, the first hard coating layer HC1 may be formed by hardening a material that includes an inorganic material, acrylic, and epoxy. The acrylic hardened by the first ultraviolet light UV-1 may be contracted, and the epoxy hardened by the first ultraviolet light UV-1 may be expanded.

A degree of warping of the first hard coating layer HC1 may be controlled depending on a composition ratio of acrylic and epoxy. For example, in an embodiment, the composition ratio of acrylic to epoxy may be about 7:3. However, embodiments of the present inventive concepts are not limited thereto. For example, in other embodiments, the composition ratio of acrylic and epoxy may be another ratio that prevents warping of the first hard coating layer HC1.

The acrylic may increase the bonding strength and density of the first hard coating layer HC1. The epoxy may increase the heat resistance, chemical resistance, water resistance, adhesion and mechanical hardness of the first hard coating layer HC1.

Figure 8:
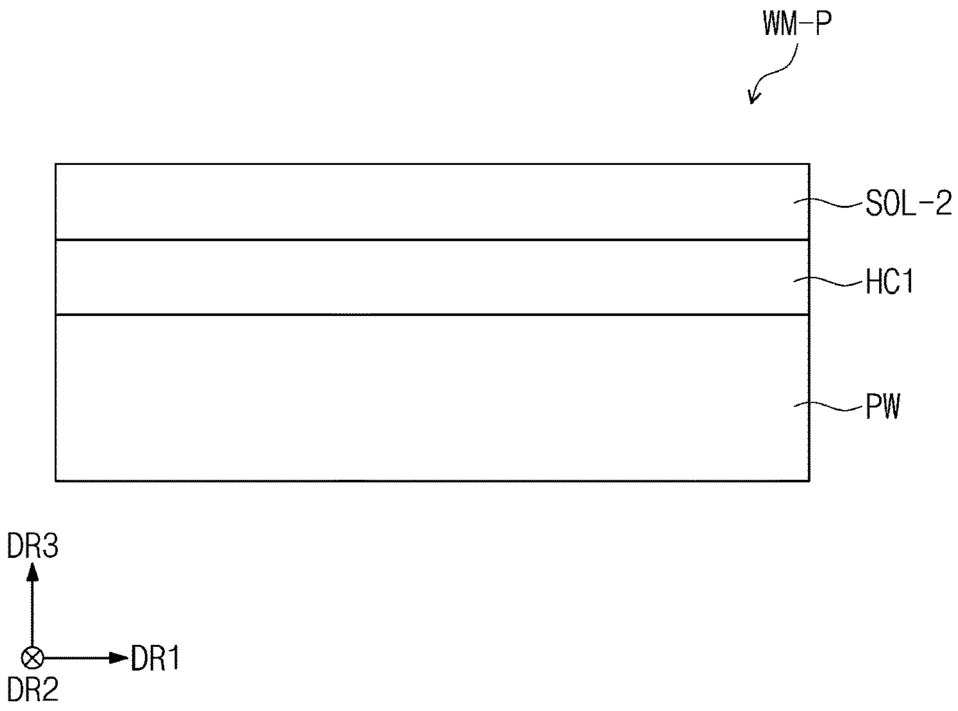
FIG. 8 is a cross-sectional view of a process of forming a second hard coating layer according to an embodiment of the present inventive concepts.

FIG. 8 is a cross-sectional view illustrating a process of forming a second hard coating layer, according to an embodiment of the present inventive concepts.

Referring to the embodiments of FIGS. 5 and 8, in block S200, a second hard coating layer HC2 (see FIG. 11) may be formed on the first hard coating layer HC1 (S200). A preliminary window WM-P may include the base material layer PW, the first hard coating layer HC1, and a second solution SOL-2. The second solution SOL-2 may be coated on the first hard coating layer HC1. For example, the second solution SOL-2 may be coated directly on an upper surface of the first hard coating layer HC1 (e.g., in the third direction DR3). In an embodiment, the second solution SOL-2 may include fluorine. A hardness and an anti-fingerprint property of a layer that includes fluorine may be improved.

The second solution SOL-2 may be hardened (e.g., cured, dried) after being coated on the first hard coating layer HC1.

Figure 9:
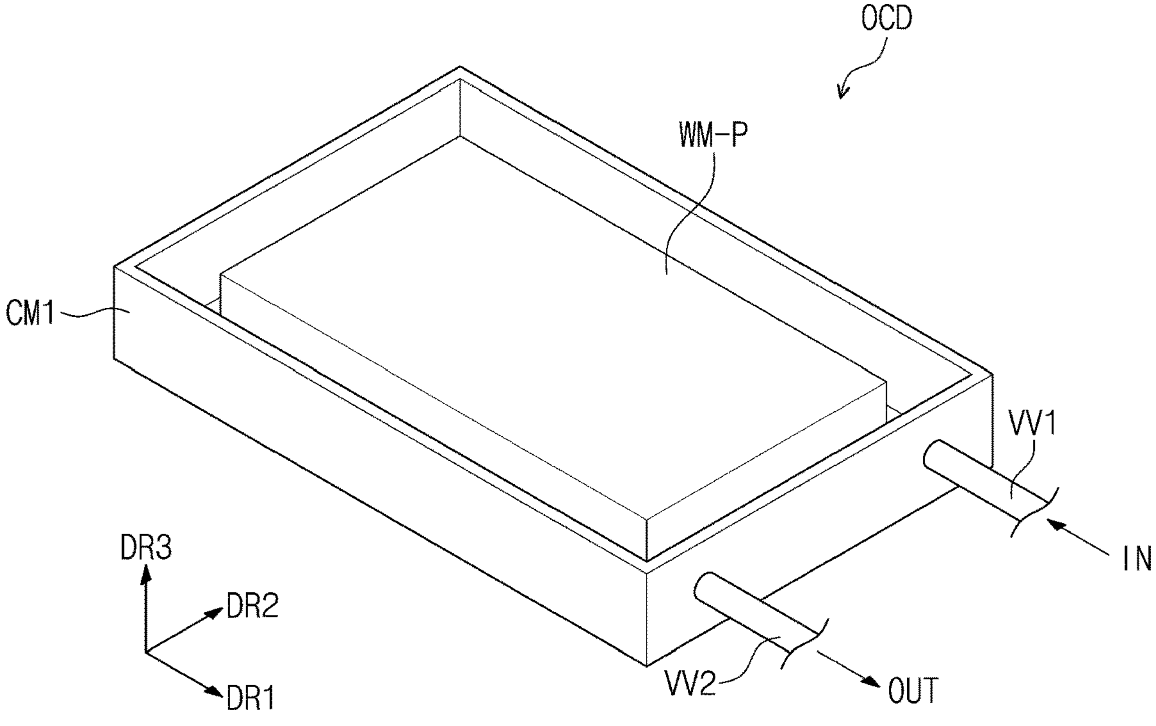
FIG. 9 is a perspective view of a process of adjusting an oxygen ratio according to an embodiment of the present inventive concepts.

FIG. 9 is a perspective view illustrating a process of adjusting an oxygen ratio according to an embodiment of the present inventive concepts.

Referring to the embodiments of FIGS. 8 and 9, an oxygen ratio control apparatus OCD may include a first chamber CM1, a first valve VV1, and a second valve VV2. The size and dimensions of the elements of the oxygen ratio control apparatus OCD may vary and are not limited to the embodiment shown in FIG. 9.

The preliminary window WM-P may be disposed in the first chamber CM1. In an embodiment, a top surface of the first chamber CM1, which faces the second solution SOL-2 coated on the first hard coating layer HC1, may be transparent.

A gas may be injected into the first chamber CM1 through the first valve VV1. In an embodiment, the gas may be a nitrogen gas. However, embodiments of the present inventive concepts are not limited thereto and the gas that injected into the first chamber CM1 may be another gas that is sufficient to lower the oxygen concentration. Air in the first chamber CM1 may be exhausted (e.g., directed outwardly) through the second valve VV2 (e.g., an exhaust valve).

The air in the first chamber CM1 may be exhausted through the second valve VV2 while the nitrogen gas injected through the first valve VV1 fills the inside of the first chamber CM1. In an embodiment, the nitrogen gas may be injected for a time of about 50 seconds to about 80 seconds. However, embodiments of the present inventive concepts are not limited thereto. While the nitrogen gas is injected in the first chamber CM1, an oxygen concentration in the first chamber CM1 may be lowered by the nitrogen gas.

In an embodiment, the oxygen concentration in the first chamber CM1 after the oxygen ratio is adjusted by the oxygen ratio control apparatus OCD may range from about 0.01% to about 0.1%. If the oxygen concentration is greater than about 0.1%, it may be difficult to provide a desired hardness and a desired anti-fingerprint property of the second hard coating layer HC2 (see FIG. 11) when the preliminary window WM-P is hardened by ultraviolet light. If the oxygen concentration is less than about 0.01%, a time for which the nitrogen gas is injected may be increased to secure the oxygen concentration less than 0.01%, and thus the efficiency of the process may be reduced.

In the method of manufacturing the window according to an embodiment of the present inventive concepts, the window WM may be manufactured in an environment in which the oxygen concentration ranges from about 0.01% to about 0.1%. An initial surface contact angle of the window WM may be improved, and thus the anti-fingerprint property of the window WM may be improved by the manufacture of the window WM in the environment having the above oxygen concentration ranges. For example, a fingerprint mark may not occur on the window WM with the improved anti-fingerprint property. Alternatively, even if a fingerprint mark occurs on the window WM with the improved anti-fingerprint property, the fingerprint mark may be simply and easily removed. Therefore, the visibility of the display device DD (see FIG. 1) may be improved. As a result, the window WM with improved reliability may be provided by the manufacturing process.

Figure 10:
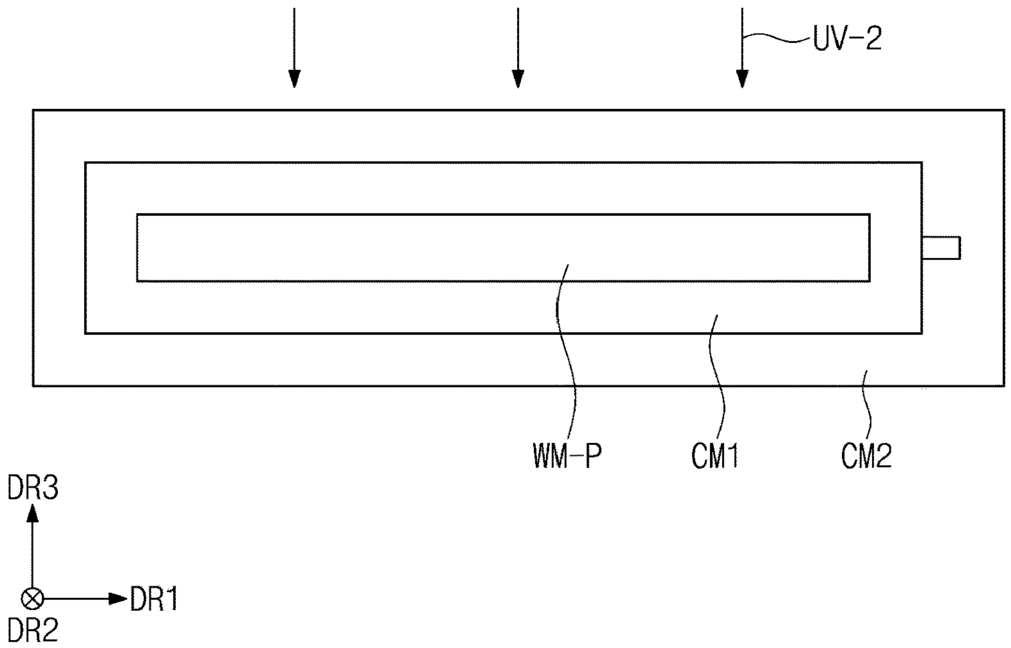
FIG. 10 is a cross-sectional view of the process of forming the second hard coating layer according to an embodiment of the present inventive concepts.

FIG. 10 is a cross-sectional view illustrating the process of forming the second hard coating layer according to an embodiment of the present inventive concepts.

Referring to the embodiments of FIGS. 9 and 10, the first chamber CM1 in which the preliminary window WM-P is disposed may be disposed in a second chamber CM2.

The preliminary window WM-P may be hardened or cured by a second ultraviolet light UV-2. The second ultraviolet light UV-2 is provided in the second chamber CM2 which includes the first chamber CM1 disposed therein. The second solution SOL-2 (see FIG. 8) is hardened by the second ultraviolet light UV-2 and forms the second hard coating layer HC2 (see FIG. 11). In an embodiment, the first hard coating layer HC1 may not be fully hardened after exposure to the first ultraviolet light UV-1 and may be additionally hardened by the second ultraviolet light UV-2.

In an embodiment, the second ultraviolet light UV-2 may have an energy of about 800 mJ to about 1000 mJ. If the energy of the second ultraviolet light UV-2 is less than about 800 mJ, a sufficient energy for hardening the second hard coating layer HC2 (see FIG. 11) may not be transferred to the second solution SOL-2. Therefore, it may be difficult to secure a desired hardening rate and a desired hardness of the second hard coating layer HC2 (see FIG. 11). If the energy of the second ultraviolet light UV-2 is greater than about 1000 mJ, the window WM may be deformed by the high energy and/or the life span of the window WM may be reduced.

Figure 11:
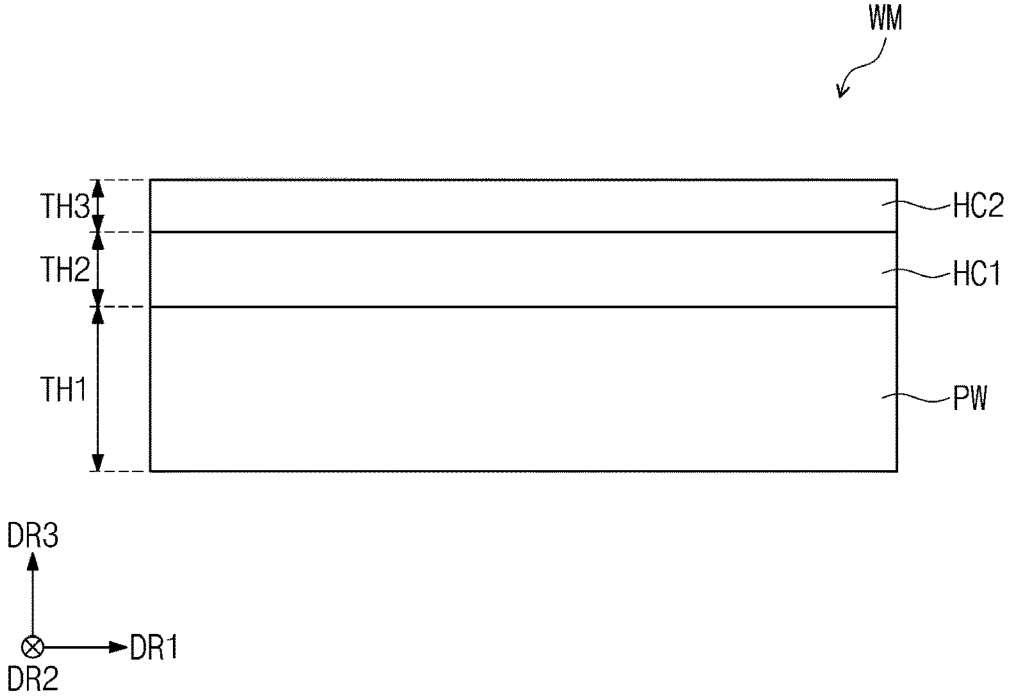
FIG. 11 is a cross-sectional view illustrating a window according to an embodiment of the present inventive concepts.

FIG. 11 is a cross-sectional view illustrating a window according to an embodiment of the present inventive concepts.

Referring to the embodiment of FIG. 11, the window WM may include the base material layer PW, the first hard coating layer HC1, and the second hard coating layer HC2. For example, the second hard coating layer HC2 may be formed directly on an upper surface of the first hard coating layer HC1 (e.g., in the third direction DR3).

In an embodiment, a first thickness TH1 (e.g., length in the third direction DR3) of the base material layer PW may be greater than a second thickness TH2 (e.g., length in the third direction DR3) of the first hard coating layer HC1. The second thickness TH2 of the first hard coating layer HC1 may be greater than a third thickness TH3 (e.g., length in the third direction DR3) of the second hard coating layer HC2. For example, in an embodiment, the first thickness TH1 may range from about 500 μm to about 800 μm, the second thickness TH2 may range from about 30 μm to about 50 μm, and the third thickness TH3 may range from about 5 μm to about 7 μm. However, embodiments of the present inventive concepts are not limited thereto.

In an embodiment, the second hard coating layer HC2 may have a pencil hardness of about 7 H to about 9 H. The pencil hardness may mean a level of hardness and/or concentration of the hardest pencil of which a surface is not damaged when the surface is scratched at an angle of 45 degrees by applying a load to the pencil. For example, the load may be about 0.75 kg. However, embodiments of the present inventive concepts are not limited thereto. For example, in another embodiment, the load may be about 1 kg.

If the pencil hardness of the second hard coating layer HC2 is lower than 7 H, the second hard coating layer HC2 may not have sufficient durability to withstand damage from an external force due to its low hardness. Thus, the second hard coating layer HC2 may not sufficiently protect the base material layer PW and the first hard coating layer HC1. If the pencil hardness of the second hard coating layer HC2 is higher than 9 H, the second hard coating layer HC2 may not have sufficient flexibility due to its high hardness. Therefore, a crack may easily occur in the second hard coating layer HC2 due to an external force or bending of the window WM.

In an embodiment, the second hard coating layer HC2 may have a hardening rate of about 75% to about 85%. For example, the hardening rate may be measured by a Fourier transform infrared (FT-IR) analysis method. In the FT-IR analysis method, energy in an infrared range may be provided to induce vibration of molecules. A difference between absorbed energies may then be measured using the vibration of the molecules to obtain data concerning the bond. Information on the hardening of the second hard coating layer HC2 may be obtained using the data concerning the bond.

For example, in an embodiment in which the second solution SOL-2 includes acrylic, a carbon double bond peak in acrylic of the second hard coating layer HC2 may be measured in a range of about 800 $cm^{-1}$ to about 820 $cm^{-1}$. The hardening of the second solution SOL-2 by the second ultraviolet light UV-2 may occur by the conversion of the carbon double bonds into carbon single bonds. At this time, the carbon double bonds may be reduced, and the peak between about 800 $cm^{-1}$ to about 820 $cm^{-1}$ may consequently be reduced. The information on the hardening of the second hard coating layer HC2 may be obtained using a change of the peak of the carbon double bonds. In an embodiment, the hardening rate may be calculated by the following equation 1.

Hardening rate (%)=((Magnitude of peak of carbon double bonds before hardening−Magnitude of peak of carbon double bonds after hardening)/(Magnitude of peak of carbon double bonds before hardening))×100 [Equation 1]

In addition, the FT-IR analysis method may calculate a relative hardening degree of the window WM by comparing magnitudes, before and after hardening, of a peak of structural elements (e.g., a bond) participating in the hardening reaction on the basis of a reference peak of a structural element that does not participate in the hardening reaction. For example, the reference peak not participating in the hardening reaction may be a peak of double bonds of carbon and oxygen, and the peak participating in the hardening reaction may be the peak of the carbon double bonds. For example, the peak of the double bonds of carbon and oxygen may be measured in a range of about 1650 $cm^{-1}$ to about 1800 $cm^{-1}$. The window WM may become more hardened as the hardening degree decreases. The hardening degree may be calculated by the following equation 2.

Hardening degree=(Magnitude of peak of carbon double bonds)/(Magnitude of peak of double bonds of carbon and oxygen) [Equation 2]

Figure 12:
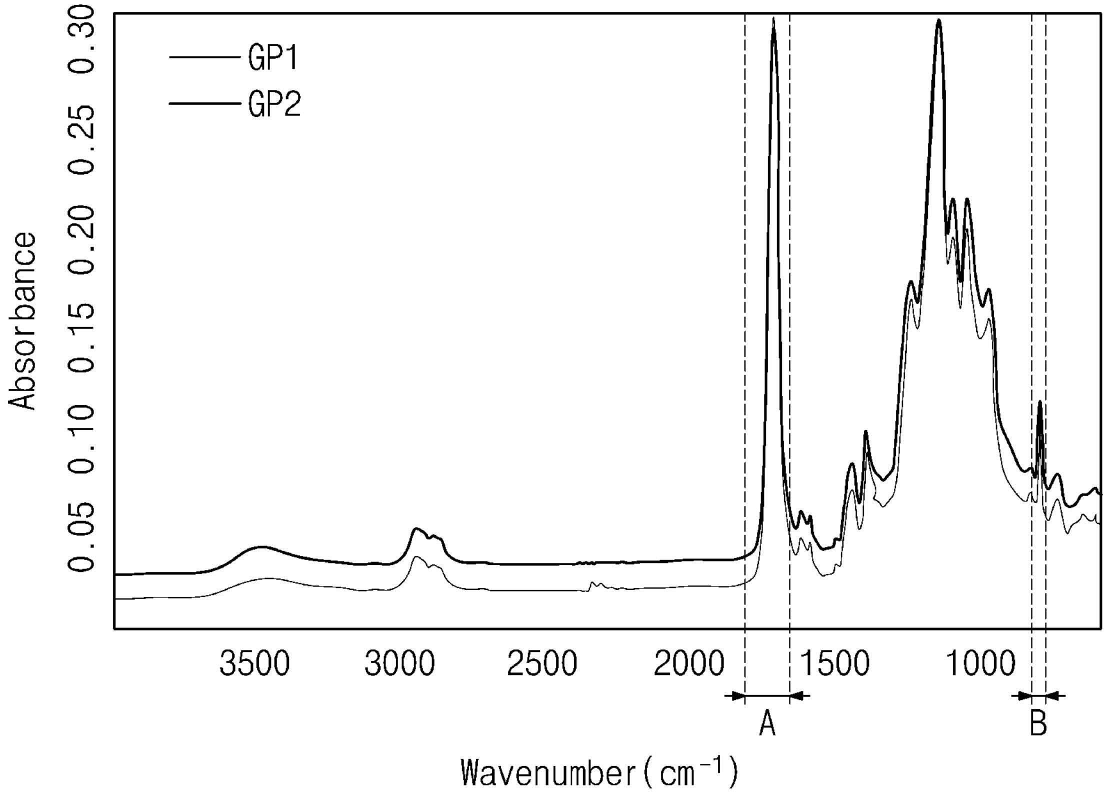
FIG. 12 is a Fourier transform infrared (FT-IR) analysis graph concerning a window of an embodiment of the present inventive concepts and a comparative example.

The following Table 1 shows results obtained by comparing the window manufactured using the processes of the embodiments of FIGS. 5 to 10 with a comparative example. FIG. 12 is a Fourier transform infrared (FT-IR) analysis graph according to an embodiment of the present inventive concepts.

TABLE 1

| | Hardening degree (C═C/C═O peak area ratio) | Hardening rate (%) |
|---|---|---|
| Embodiment 1-1 | 0.044 | 76.71 |
| Comparative example 1-1 | 0.050 | 73.38 |

Referring to Table 1 and FIG. 12, FIG. 12 is a graph obtained by measuring an absorbance according to a wavenumber by analyzing infrared spectra (or Fourier transform infrared) of the embodiment 1-1 and the comparative example 1-1. The embodiment 1-1 may be the window WM formed by the method of manufacturing the window according to the embodiment of the present inventive concepts. For example, the embodiment 1-1 may be the window WM manufactured by performing the process of hardening the second hard coating layer HC2 in the environment having the oxygen concentration of about 0.01% to about 0.1%. The infrared spectrum results for the embodiment 1-1 may have a shape of a first graph GP1.

The comparative example 1-1 may be a window manufactured by performing a process of forming the second hard coating layer HC2 in an environment having an oxygen concentration of 21%. The infrared spectrum results for the comparative example 1-1 may have a shape of a second graph GP2.

A first area 'A' may show the peak of the double bonds of carbon and oxygen. For example, the first area 'A' may have a wavenumber of about 1650 $cm^{-1}$ to about 1800 $cm^{-1}$. A second area 'B' may show the peak of the carbon double bonds. For example, the second area 'B' may have a wavenumber of about 800 $cm^{-1}$ to about 820 $cm^{-1}$. In the second area 'B', a peak value of the carbon double bonds of the embodiment 1-1 may be less than a peak value of the carbon double bonds of the comparative example 1-1.

The hardening degree of the embodiment 1-1 is 0.044. The hardening degree of the comparative example 1-1 is 0.050. The hardening degree of the embodiment 1-1 is less than the hardening degree of the comparative example 1-1. The hardening rate of the embodiment 1-1 is 76.71% and is greater than the hardening rate of 73.38% of the comparative example 1-1. Thus, the window WM of the embodiment 1-1 may be more hardened than the window of the comparative example 1-1.

Referring to the embodiment of FIG. 11, the second hard coating layer HC2 may have a hardness of about 450 MPa to about 550 MPa. For example, the hardness may be measured by a nanoindentation test. In the nanoindentation test, a load may be applied to a surface of the second hard coating layer HC2 by using an indenter having a certain geometric shape, and a hardness may be measured through analysis of an indentation load-displacement curved line obtained by continuously monitoring the load amount and a depth of indentation. The hardness may be a value obtained by dividing the load amount by an area of an indentation trace.

If the hardness of the second hard coating layer HC2 is lower than about 450 MPa, the second hard coating layer HC2 may not have sufficient durability with respect to an external force due to its low hardness. Therefore, the second hard coating layer HC2 may not sufficiently protect the base material layer PW and the first hard coating layer HC1. If the hardness of the second hard coating layer HC2 is higher than about 550 MPa, the second hard coating layer HC2 may not have sufficient flexibility due to its high hardness. Therefore, a crack may easily occur in the second hard coating layer HC2 due to an external force or bending of the window WM.

The following Table 2 shows results obtained by comparing the window manufactured using the processes of the embodiments of FIGS. 5 to 10 with comparative examples.

TABLE 2

| | Hardness (MPa) | Hardening rate (%) |
|---|---|---|
| Embodiment 1-2 | 510.6 | 84.8 |
| Comparative example 1-2 | 421.7 | 79.7 |
| Comparative example 2-2 | 444.6 | 84.3 |

Referring to Table 2, the embodiment 1-2 may be the window WM formed by the method of manufacturing the window according to an embodiment of the present inventive concepts. For example, the process of forming the second hard coating layer HC2 may be performed in the environment having the oxygen concentration of about 0.01% to about 0.1% and may be performed using the second ultraviolet light UV-2 (see FIG. 10) having the energy of about 1000 mJ, thereby manufacturing the window WM of the embodiment 1-2. The process of forming the second hard coating layer HC2 may be performed in an environment having an oxygen concentration of 21% and may be performed using the second ultraviolet light UV-2 (see FIG. 10) having the energy of 1000 mJ, thereby manufacturing a window of the comparative example 1-2.

The process of forming the second hard coating layer HC2 may be performed in the environment having an oxygen concentration of 21% and may be performed using the second ultraviolet light UV-2 (see FIG. 10) having an energy of 1600 mJ, thereby manufacturing a window of the comparative example 2-2.

The hardness of the embodiment 1-2 is 510.6 MPa and is greater than the hardness (421.7 MPa) of the comparative example 1-2 and the hardness of 444.6 MPa of the comparative example 2-2.

The hardening rate of the embodiment 1-2 is 84.8% and is greater than the hardening rate of 79.7% of the comparative example 1-2. The hardening rate of 84.3% of the comparative example 2-2 is similar to the hardening rate of the embodiment 1-2 due to the high energy of the second ultraviolet light UV-2 (see FIG. 10). However, the hardness of the comparative example 2-2 is less than the hardness of the embodiment 1-2. In addition, the energy of 1600 mJ of the second ultraviolet light UV-2 (see FIG. 10) of the comparative example 2-2 is greater than 1000 mJ, and thus the window may be deformed and/or the life span of the window may be reduced.

In the method of manufacturing the window according to an embodiment of the present inventive concepts, the window WM may be manufactured in an environment in which the oxygen concentration ranges from about 0.01% to about 0.1%. Thus, the hardness and the hardening rate of the window WM may be improved. The window WM with the improved hardness and hardening rate may have sufficient durability against an external force directed on the window WM. The window WM may protect the display panel DP (see FIG. 1), and thus the display device DD (see FIG. 1) with improved durability may be provided. As a result, the window WM with improved reliability may be provided.

Referring to the embodiment of FIG. 11, the second hard coating layer HC2 may include fluorine. The second hard coating layer HC2 may have an anti-fingerprint property. The second hard coating layer HC2 may prevent a fingerprint of the user from being left on the window WM so as to be visible to the user and to decrease the visibility and image quality of the image IM on the display surface IS (see FIG. 1).

The second hard coating layer HC2 may have a surface contact angle of about 100 degrees to about 120 degrees. For example, the surface contact angle may be measured by dropping water ($H_2O$) on a surface of the window WM. The surface contact angle may be an angle adjacent to the water of the plurality of angles between the surface of the window WM and gradients formed by the water and the surface.

If the surface contact angle of the second hard coating layer HC2 is less than about 100 degrees, the second hard coating layer HC2 may not have a sufficient anti-fingerprint property and a fingerprint of the user may be left on the window WM and may be difficult to remove. If the surface contact angle of the second hard coating layer HC2 is greater than about 120 degrees, an image shown through the window WM may be refracted.

The following table 3 shows results obtained by comparing the window manufactured using the processes of the embodiments of FIGS. 5 to 10 with comparative examples.

TABLE 3

| | Initial surface contact angle (°) | Surface contact angle after wear resistance evaluation (°) |
|---|---|---|
| Embodiment 1-3 | 113 | 103 |
| Comparative example 1-3 | 106 | 76 |

Referring to Table 3, a wear resistance evaluation may be performed on the window WM. For example, in the wear resistance evaluation the surface of the window WM may be rubbed approximately 3000 times with an industrial eraser. At this time, a speed of the industrial eraser may be 40 rpm, and the rubbing process may be performed in a state where a load of 1 kgf is applied. Water may be dropped to the surface of the window WM after the wear resistance evaluation, and a surface contact angle after the wear resistance evaluation may be measured. The embodiment 1-3 may be the window WM formed by the method of manufacturing the window according to an embodiment of the present inventive concepts. For example, the embodiment 1-3 may be the window WM manufactured by performing the process of forming the second hard coating layer HC2 in the environment having the oxygen concentration of about 0.01% to about 0.1%. The initial surface contact angle of the embodiment 1-3 is 113°. The surface contact angle of the embodiment 1-3 after the wear resistance evaluation is 103°.

The comparative example 1-3 may be a window manufactured by performing a process of hardening the second hard coating layer HC2 in an environment having an oxygen concentration of 21%. The initial surface contact angle of the comparative example 1-3 is 106°. The surface contact angle of the comparative example 1-3 after the wear resistance evaluation is 76°.

The initial surface contact angle of the embodiment 1-3 may be greater than the initial surface contact angle of the comparative example 1-3. Therefore, the anti-fingerprint property of the embodiment 1-3 may be higher than the anti-fingerprint property of the comparative example 1-3.

The surface contact angle of the embodiment 1-3 after the wear resistance evaluation may be greater than the surface contact angle of the comparative example 1-3 after the wear resistance evaluation. After the wear resistance evaluation, the anti-fingerprint property of the embodiment 1-3 may be higher than the anti-fingerprint property of the comparative example 1-3.

In the method of manufacturing the window according to an embodiment of the present inventive concepts, the window WM may be manufactured in the environment in which the oxygen concentration ranges from about 0.01% to about 0.1%. The window WM may have the high anti-fingerprint property after the wear resistance evaluation. Thus, the wear resistance of the window WM may be improved. The window WM may be scratch resistant. As a result, the window WM with improved reliability may be provided.

The following Table 4 shows results obtained by comparing the window manufactured using the processes of the embodiments of FIGS. 5 to 10 with comparative examples.

TABLE 4

| | Wear resistance evaluation | Surface fluorine content |
|---|---|---|
| Embodiment 1-4 | Before | 0.767 |
| | After | 0.686 |
| Comparative example 1-4 | Before | 0.419 |
| | After | 0.203 |

Referring to Table 4, the surface fluorine content may mean a content of fluorine when the total composition forming a surface of the second hard coating layer HC2 is 1. The embodiment 1-4 may be the window WM formed by the method of manufacturing the window according to an embodiment of the present inventive concepts. For example, the embodiment 1-4 may be the window WM manufactured by performing the process of hardening the second hard coating layer HC2 in the environment having the oxygen concentration of about 0.01% to about 0.1%. The surface fluorine content of the embodiment 1-4 is 0.767. The surface fluorine content of the embodiment 1-4 after the wear resistance evaluation is 0.686. The comparative example 1-4 may be a window manufactured by performing a process of forming the second hard coating layer HC2 in an environment having an oxygen concentration of 21%. The surface fluorine content of the comparative example 1-4 is 0.419. The surface fluorine content of the comparative example 1-4 after the wear resistance evaluation is 0.203.

The surface fluorine content of the embodiment 1-4 may be greater than the surface fluorine content of the comparative example 1-4. The surface fluorine content and the surface contact angle may be in proportion to the anti-fingerprint property. Thus, the anti-fingerprint property of the embodiment 1-4 may be higher than the anti-fingerprint property of the comparative example 1-4.

The surface fluorine content of the embodiment 1-4 after the wear resistance evaluation may be greater than the surface fluorine content of the comparative example 1-4 after the wear resistance evaluation. After the wear resistance evaluation, the anti-fingerprint property of the embodiment 1-4 may be higher than the anti-fingerprint property of the comparative example 1-4.

A difference between the surface fluorine content of the embodiment 1-4 before and after the wear resistance evaluation is 0.081, and a difference between the surface fluorine content of the comparative example 1-4 before and after the wear resistance evaluation is 0.216. Thus, the wear resistance of the embodiment 1-4 may be stronger than the wear resistance of the comparative example 1-4.

In the method of manufacturing the window according to the inventive concepts, the window may be manufactured in the environment in which the oxygen concentration ranges from about 0.01% to about 0.1%. Therefore, the initial surface contact angle of the window may be improved, and thus the anti-fingerprint property of the window may be improved. A fingerprint mark may not be left on the surface of the window with the improved anti-fingerprint property. Furthermore, even in instances in which a fingerprint mark is left on the surface of the window with the improved anti-fingerprint property, the fingerprint mark may be simply and easily removed. Thus, the visibility of the display device may be improved. In addition, the wear resistance of the window may be improved, and thus the window may be scratch resistant. The window may have the high anti-fingerprint property after the wear resistance evaluation. As a result, the reliability of the window and the display device may be improved.

While the present inventive concepts have been described with reference to embodiments, it will be apparent to those skilled in the art that various changes and modifications may be made without departing from the spirits and scopes of the present inventive concepts. Therefore, it should be understood that the above embodiments are not limiting, but illustrative. Thus, the scopes of the present inventive concepts are not limited by the foregoing description of embodiments.

What is claimed is:

1. A window comprising:
a base material layer;
a first hard coating layer disposed on the base material layer; and
a second hard coating layer disposed on the first hard coating layer and formed by curing a second solution,
wherein the second hard coating layer has a hardening rate of about 75% to about 85%, the hardening rate comprising an extent of curing of the second solution and a surface contact angle with water of about 100 degrees to about 120 degrees,
wherein the second hard coating layer has a nanoindentation hardness of about 450 MPa to about 550 MPa,
wherein a thickness of the base material layer is in a range of about 500 μm to about 800 μm;
wherein a thickness of the first hard coating layer is in a range of about 30 μm to about 50 μm, and
wherein a thickness of the second hard coating layer is in a range of about 5 μm to about 7 μm.

2. The window of claim 1, wherein the second hard coating layer has a pencil hardness of about 7 H to about 9 H.

3. The window of claim 1, wherein the first hard coating layer includes epoxy and acrylic.

4. The window of claim 1, wherein the second hard coating layer includes fluorine.

5. The window of claim 1, wherein a first thickness of the base material layer is greater than a second thickness of the first hard coating layer, and
wherein the second thickness of the first hard coating layer is greater than a third thickness of the second hard coating layer.

6. A display device comprising:
a display panel; and
a window disposed on the display panel,
wherein the window comprises:
a base material layer;
a first hard coating layer disposed on the base material layer; and
a second hard coating layer disposed on the first hard coating layer and formed by curing a second solution,
wherein the second hard coating layer has a hardening rate of about 75% to about 85%, the hardening rate comprising an extent of curing of the second solution, a nanoindentation hardness of about 450 MPa to about 550 MPa, and a surface contact angle with water of about 100 degrees to about 120 degrees,
wherein a thickness of the base material layer is in a range of about 500 μm to about 800 μm;
wherein a thickness of the first hard coating layer is in a range of about 30 μm to about 50 μm, and
wherein a thickness of the second hard coating layer is in a range of about 5 μm to about 7 μm.

7. The display device of claim 6, wherein at least one lateral end of the window has a curved surface.

8. The display device of claim 6, wherein a first thickness of the base material layer is greater than a second thickness of the first hard coating layer, and
wherein the second thickness of the first hard coating layer is greater than a third thickness of the second hard coating layer.

9. The display device of claim 6, wherein the first hard coating layer includes epoxy and acrylic.

10. The display device of claim 6, wherein the second hard coating layer includes fluorine.

11. The display device of claim 6, wherein the second hard coating layer has a pencil hardness of about 7 H to about 9 H.

12. An electronic device, comprising:
a display device comprising:
a display panel; and
a window disposed on the display panel,
wherein the window comprises:
a base material layer;
a first hard coating layer disposed on the base material layer; and
a second hard coating layer disposed on the first hard coating layer and formed by curing a second solution,
wherein the second hard coating layer has a hardening rate of about 75% to about 85%, the hardening rate comprising an extent of curing of the second solution and a surface contact angle with water of about 100 degrees to about 120 degrees,
wherein the second hard coating layer has a nanoindentation hardness of about 450 MPa to about 550 MPa,
wherein a thickness of the base material layer is in a range of about 500 μm to about 800 μm;
wherein a thickness of the first hard coating layer is in a range of about 30 μm to about 50 μm, and
wherein a thickness of the second hard coating layer is in a range of about 5 μm to about 7 μm.

* * * * *